US008270995B1

(12) United States Patent
Manroa et al.

(10) Patent No.: US 8,270,995 B1
(45) Date of Patent: Sep. 18, 2012

(54) COMPOSITE APPLICATION FOR GROUP-BASED ACTIVITY RESERVATIONS

(75) Inventors: Arun Manroa, Herndon, VA (US); Ojas T. Choksi, Farmers Branch, TX (US)

(73) Assignee: Nextel Communications, Inc., Reston, VA (US)

( * ) Notice: Subject to any disclaimer, the term of this patent is extended or adjusted under 35 U.S.C. 154(b) by 1036 days.

(21) Appl. No.: 11/740,796

(22) Filed: Apr. 26, 2007

(51) Int. Cl.
*H04M 1/00* (2006.01)

(52) U.S. Cl. ............... 455/456.3; 455/456.1; 455/456.2

(58) Field of Classification Search .... 455/456.1–456.3, 455/457, 456, 404.2, 414.1–414.3; 370/322
See application file for complete search history.

(56) References Cited

U.S. PATENT DOCUMENTS

| | | | | |
|---|---|---|---|---|
| 6,774,840 | B1 * | 8/2004 | Adamczyk et al. | 342/357.1 |
| 6,944,447 | B2 * | 9/2005 | Portman et al. | 455/422.1 |
| 7,328,029 | B1 * | 2/2008 | Adamczyk et al. | 455/456.3 |
| 7,529,558 | B1 * | 5/2009 | Blair et al. | 455/519 |
| 2003/0120522 | A1 * | 6/2003 | Uyeki | 705/5 |
| 2003/0139174 | A1 * | 7/2003 | Rao | 455/418 |
| 2004/0263385 | A1 * | 12/2004 | Adamczyk et al. | 342/357.1 |
| 2005/0083904 | A1 * | 4/2005 | Khartabil et al. | 370/351 |
| 2005/0101335 | A1 * | 5/2005 | Kelly et al. | 455/456.3 |
| 2006/0030333 | A1 | 2/2006 | Ward et al. | |
| 2006/0105783 | A1 * | 5/2006 | Giraldin et al. | 455/456.3 |
| 2006/0116149 | A1 * | 6/2006 | Dunn et al. | 455/518 |
| 2006/0123053 | A1 * | 6/2006 | Scannell, Jr. | 707/104.1 |
| 2006/0270421 | A1 * | 11/2006 | Phillips et al. | 455/457 |
| 2007/0244633 | A1 * | 10/2007 | Phillips et al. | 701/207 |
| 2008/0200251 | A1 * | 8/2008 | Alderucci et al. | 463/42 |
| 2008/0228775 | A1 * | 9/2008 | Abhyanker et al. | 707/10 |

* cited by examiner

*Primary Examiner* — Jinsong Hu
*Assistant Examiner* — Nathan Taylor (57) ABSTRACT

A reservation is made over a wireless network for a group-based activity, such as golf, using a network-independent composite application. The composite application registers with a geo-fencing application, and receives notifications from the geo-fencing application when certain triggering criteria have been satisfied. In certain embodiments, the triggering criteria relate to the presence of target subscriber within a predetermined area. The availability of certain target subscribers is also determined and, if available, such target subscribers are provided with the opportunity to opt-in to the group-based activity. A reservation may be automatically made for the group-based activity using an online reservation application for target subscribers who chose to participate.

16 Claims, 7 Drawing Sheets

COMPOSITE APPLICATION FOR GROUP-BASED ACTIVITY RESERVATIONS

FIELD OF THE INVENTION

The present invention relates generally to network services, and more particularly to developing and providing a network-independent composite application for making group-based activity reservations.

BACKGROUND OF THE INVENTION

Wireless communications are provided to users using several different network protocols, such as 850, 900, 1800 and 1900 MHz Global System for Mobile Communications (GSM); Time Division Multiple Access Code (TDMA); Code Division Multiple Access (CDMA); iDEN and so on. In addition, there are varying mobile device technologies, thereby causing subscribers to have different communication functionalities and/or different protocols for implementing specific functionalities (e.g., messaging, navigation, etc.)

In addition, there are numerous network layer services that may be available to such subscribers, depending on current network coverage, as well as the subscribers' mobile device capabilities. Such network layer services may include location-based service, messaging service, conferencing service, presence service, etc.

Given the number of differing types of network coverages, mobile device technologies and network layer services, there is a need to develop and provide network-independent composite applications to provide additional functionality to subscribers.

SUMMARY OF THE INVENTION

Disclosed and claimed herein are methods and computer program products for making a reservation over a wireless network for a group-based activity using a network-independent composite application. In one embodiment, a method includes registering the composite application with a subscriber location network application, and receiving, by the composite application, a notification from the subscriber location network application indicating that a target subscriber is within a predetermined area. The method further includes determining, automatically based on the notification, an availability of the target subscriber, and providing, if available, the target subscriber with an option to participate in the group-based activity. In addition, the method includes making a reservation for the target subscriber to participate in the group-based activity using an online reservation application in response to the target subscriber opting to participate.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

One aspect of the invention relates to providing a set of base network applications which are network-independent and which third-party applications developers may use as standard components in the development of so-called composite applications. Such base network applications may include one or more network-dependent services, or may not rely on such network services at all. In certain embodiments, base applications are network-independent applications which provides specific network functionality to subscribers.

Another aspect of the invention relates to providing composite applications which may be a compilation of two or more base applications—the combination of which itself provides a new subscriber service. Composite applications may be developed by accessing the particular base applications using a standard application programming interface (API), or similar network-independent standard interface, thereby enabling the composite applications to be developed without having to write network-specific versions or variations thereof. In addition, composite applications may be a compilation of one or more base applications, in conjunction with one or more network services. In certain embodiments, composite applications comprise specific logic (hardware or software) for accessing and interfacing with the underlying base applications and/or network layer services.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

Figure 1:
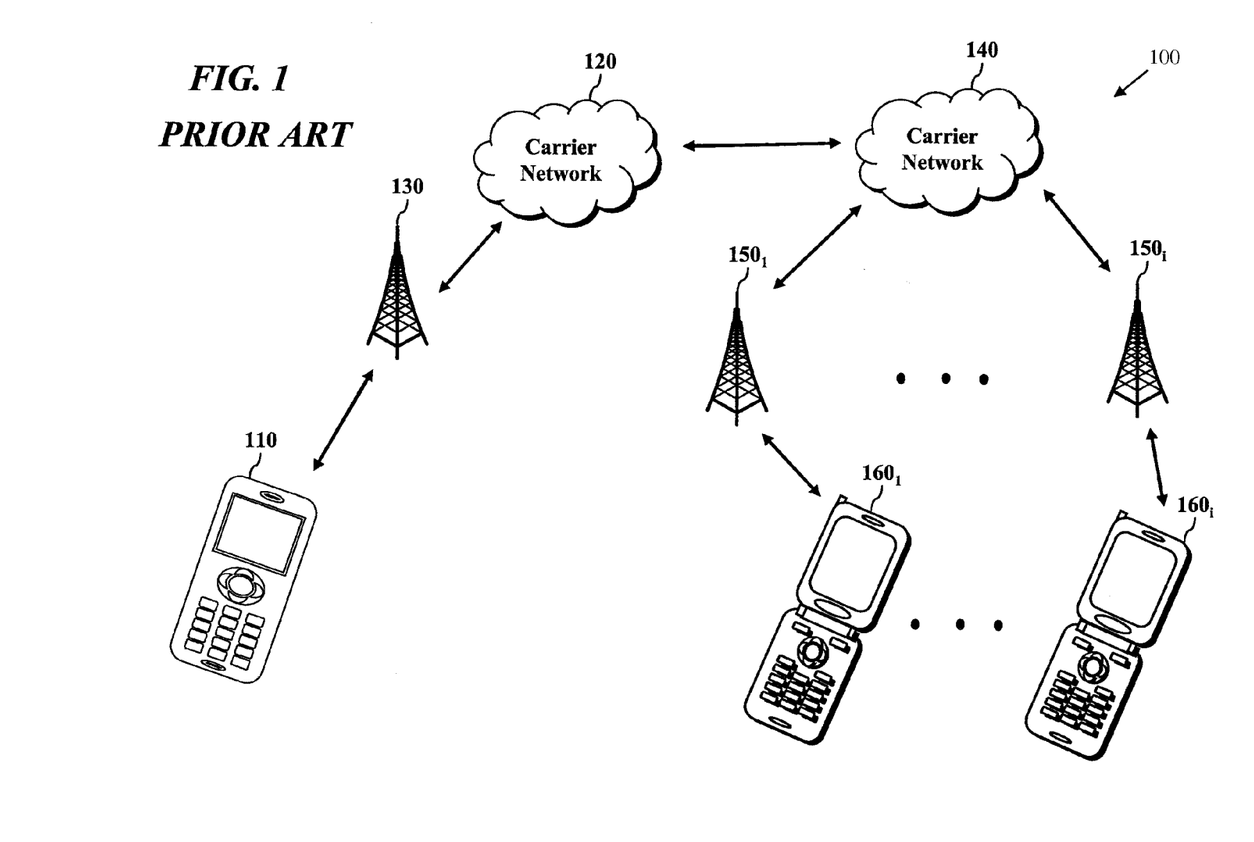
FIG. 1 is a block diagram illustrating a typical communication system in which one or more aspects of the invention may be implemented.

FIG. 1 illustrates a block diagram of a typical communication system 100 usable in connection with one or more aspects of the invention. In one embodiment, the communication system 100 serves an initiating subscriber 110 which may communicate with its carrier network 120 via a local base station 130. It should be appreciated that the initiating subscriber 110 may be a user of a cellular telephone, or a cellular-capable personal digital assistant (PDA), or any similar cellular-capable device. It should be appreciated that the initiating subscriber 110 device may be capable of dispatch calling, interconnect calling, roaming, message mail and/or data communications. Dispatch communication signalling can be provided using session initiation protocol (SIP) and media can be transported using real-time protocol (RTP), both of which can be carried in Internet Protocol (IP) packets.

Carrier network 120 may be configured to provide a myriad of network layer services, including but certainly not limited to location-based service, messaging service, conferencing service, presence service, etc. In addition, the initiating subscriber 110's device may be equipped to provide numerous features to the initiating subscriber in connection with the various network layer services which may be available at any given time. As previously mentioned, such device features may include browser applications, chat clients, email clients, Java, personal information management applications and so on.

Continuing to refer to FIG. 1, initiating subscriber 110 may be desirous of communicating with target subscribers $160_1$-$160_i$ ("160"). In certain embodiments, target subscribers 160 may be connected to a different carrier network 140 and serviced by separate base stations $150_1$-$150_i$ ("150"). Moreover, as the initiating subscriber 110 moves from having network coverage from carrier network 120 to a different carrier network (e.g., carrier network 140), the available network layer services may similarly change. In addition, it should be appreciated that carrier networks 120 and 140 may be GSM, CDMA, iDEN, etc., and may be accessible using a variety of access technologies (e.g., IP Multimedia Subsystem (IMS)).

As will be described in more detail below, as target subscribers 160 move between base stations 150, a subscriber location network application may be used to notify the initiating subscriber 110 of this information. In one embodiment, one such application is the so-called "geo-fencing" application. Since mobile devices (e.g., target subscribers 160) automatically register with the appropriate base station(s) as they move into a new area, this information may be used to generally determine what particular area a given mobile device is in. Networks require that base stations maintain a log of the mobile devices moving into and out of their coverage areas in order to properly control radio traffic (e.g., message and data delivery, dispatch communications, etc.). In addition, finer location information may be determined using global positioning system (GPS) technology, as is known in the art.

Figure 2A:
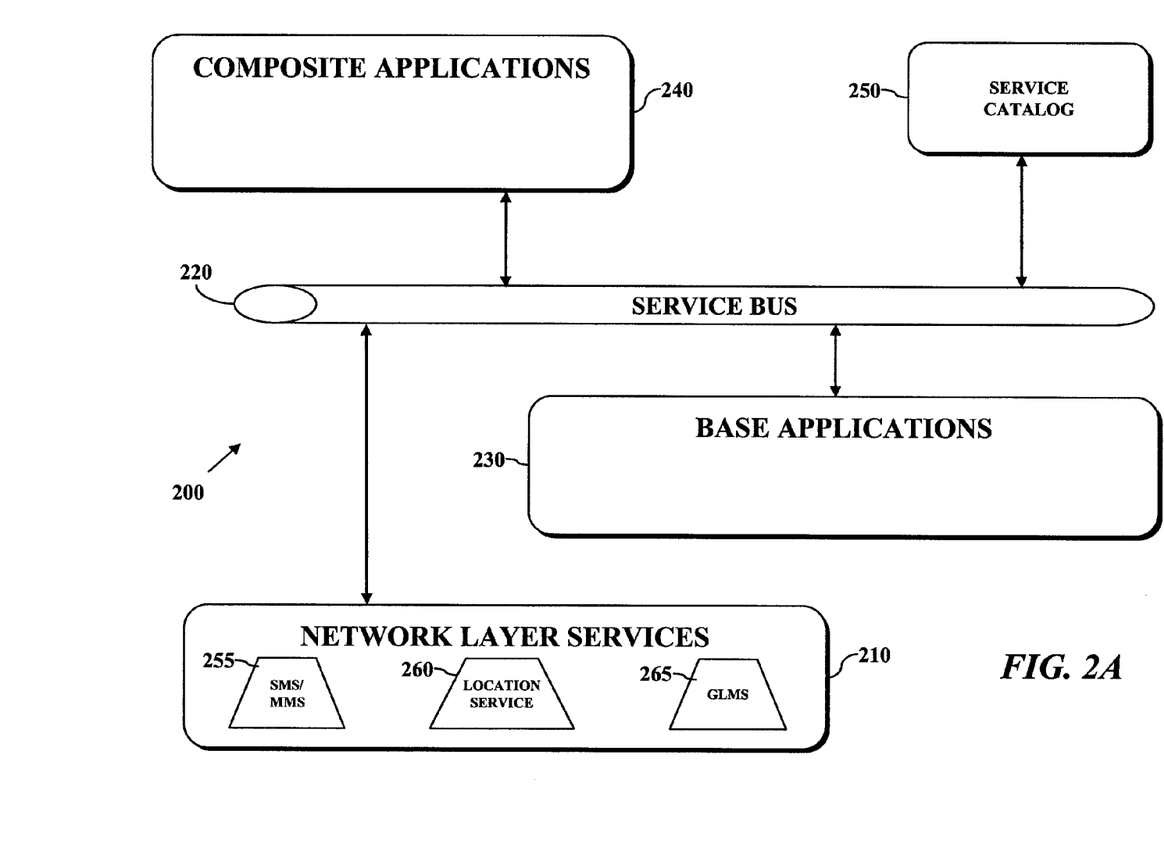
FIG. 2A-2B depict block diagrams of a network application architecture for implementing one embodiment of the invention.

FIG. 2A depicts a block diagram showing a network application architecture 200 configured to implement one or more embodiments of the invention. As shown, a plurality of network layer services 210 are callable, and hence accessible, from service bus 220. Network layer services 210 are essentially network-specific functions which vary from network-type to network-type, and which may be called across the service bus 220 using specific network logic (e.g., hardware, software, etc).

One category of network layer services are messaging services 255, which include Short Message Service (SMS), Multimedia Messaging Service (MMS), and Wireless Application Protocol (WAP) service. In addition, the location-based service 260 may be based on GPS technology, for example. In another embodiment, the location-based service 260 may be based on the aforementioned fact that mobile subscribers are required to register with the appropriate base stations as they move into a new area. Group List Management Service (GLMS) 265 refers to a service by which a group of target subscribers (e.g., target subscribers 160) may be defined by an initiating subscriber (e.g., initiating subscriber 110), or any administrator or designated delegate for group management. GLMS may be used to provide group operations, including so-called CRUD (Create, Retrieve, Update and Delete) operations.

Additional network layer services include conferencing services, presence service, GLMS, policy service, address translation service, policy and QoS service, charging service (e.g., mobile e-payment), etc. In one embodiment, so-called "presence service" may be used to provide real-time information about the status of subscribers. This information can include a range of details from whether a device is on or off, through to more advanced information about users' availability, such as indicating whether they are driving or in a meeting. While in the embodiment of FIG. 2A, the network layer services 210 include the SMS/MMS messaging service 255, location service 260 and GLMS service 265, it should be appreciated that numerous other network layer services may similarly be included.

Heretofore, third-party development of wireless applications required knowledge of the types of subscribers that will be accessing the subject application. That is, the various wireless applications had to be written in compliance with the various communication technologies and protocols (e.g., iDEN, CDMA) of the potential users. This is due to the fact that such wireless applications interface directly with the underlying network layer services (e.g., network layer services 210), which are network/technology specific as mentioned above.

To that end, one aspect of the invention is to provide a set of base network applications 230 which are network-independent and which third-party applications developers may use as standard components in the development of so-called composite applications 240. Such base network applications 230 may include one or more network layer services 210, or in contrast may not rely on the network layer services 210. In certain embodiments, base applications 230 are network-independent applications which provides specific network functionality to subscribers. In certain embodiments, a base application 230 may be a compilation of two or more network layer services 210, which manifest as a new function or subscriber service.

Composite applications 240, in turn, may be a compilation of two or more base applications 230—the combination of which itself provides a new subscriber service. Composite applications 240 may be developed by accessing the particular base applications 230 using a standard API, or similar network-independent standard interface, thereby enabling the composite applications 240 to be developed without having to write network-specific versions or variations thereof. In addition, composite applications 240 may be a compilation of one or more base applications 230, in conjunction with one or more network services 210. Like base applications 230, composite applications 240 may be network independent. Finally, a given composite application may be considered a base application when combined with other base applications and/or network layer services. In any event, composite applications 240 may comprise specific logic (hardware or software) for accessing and interfacing with the underlying base applications 230 and/or network layer services 210.

Continuing to refer to FIG. 2A, the network application architecture 200 further includes a service catalog 250, which may comprise an online resource, such as a portal, from which would-be third-party developers of composite applications 240 may access network layer services 210 and/or available base applications 230, as well as access any APIs needed for interfacing with such base applications 230, and any other instructions relating thereto. In one embodiment, the various available network layer services 210 and available base applications 230 may be cataloged by the service catalog 250 in a table, database or other organized fashion, along with the API(s) required for invoking such functionality.

Figure 2B:
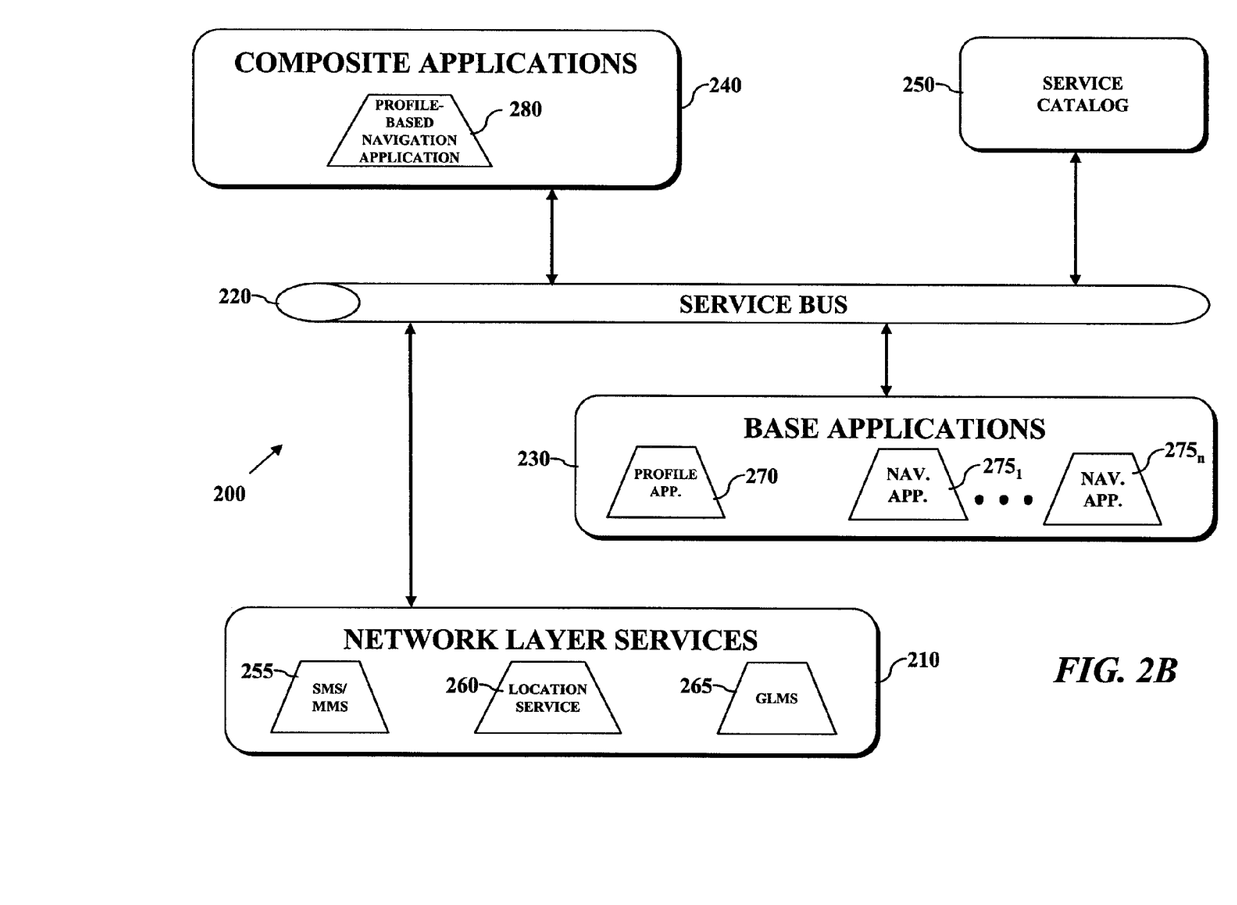

Referring now to FIG. 2B, depicted is another embodiment the network application architecture 200 of FIG. 2A. However, the embodiment of FIG. 2B depicts how certain network layer services 210 may be used in combination to provide base applications 230 for generating, in turn, the profile-based navigation composite application 280. In particular, the subscriber profile base application 270 is a network-independent application through which a subscriber may provide user preference data, such as hobbies, favorites, interests, etc. Base applications 230 may further include a plurality of navigation applications $275_1$-$275_n$ ("275"), such as TeleNav or a so-called Garmin application. In one embodiment, the navigation applications 275 may be network-independent applications which includes logic for calling the location service 260.

To that end, using specific logic the profile-based navigation composite application 280 may invoke the SMS/MMS messaging network service 255 directly over the service bus 220, as well as both the subscriber profile application 270 and the navigation application 275. The logic combination underlying the profile-based navigation composite application 280 provides the network-independent functionality of providing subscribers with profile-based navigation services. Since subscribers may have a different types of navigation applications 275, the profile-based navigation composite application 280 may invoke the subscriber profile application 270 by providing it with a destination address and a list of subscribers that need to be navigated to that destination address. The subscriber profile application 270 may in turn provide the profile-based navigation composite application 280 with an indication of what type of navigation application the subject subscriber uses (e.g., TeleNav, Garmin, etc.). In this fashion, the profile-based navigation composite application 280 will know which navigation application to interact with in order to provide the subject subscriber with navigation services.

Figure 3:
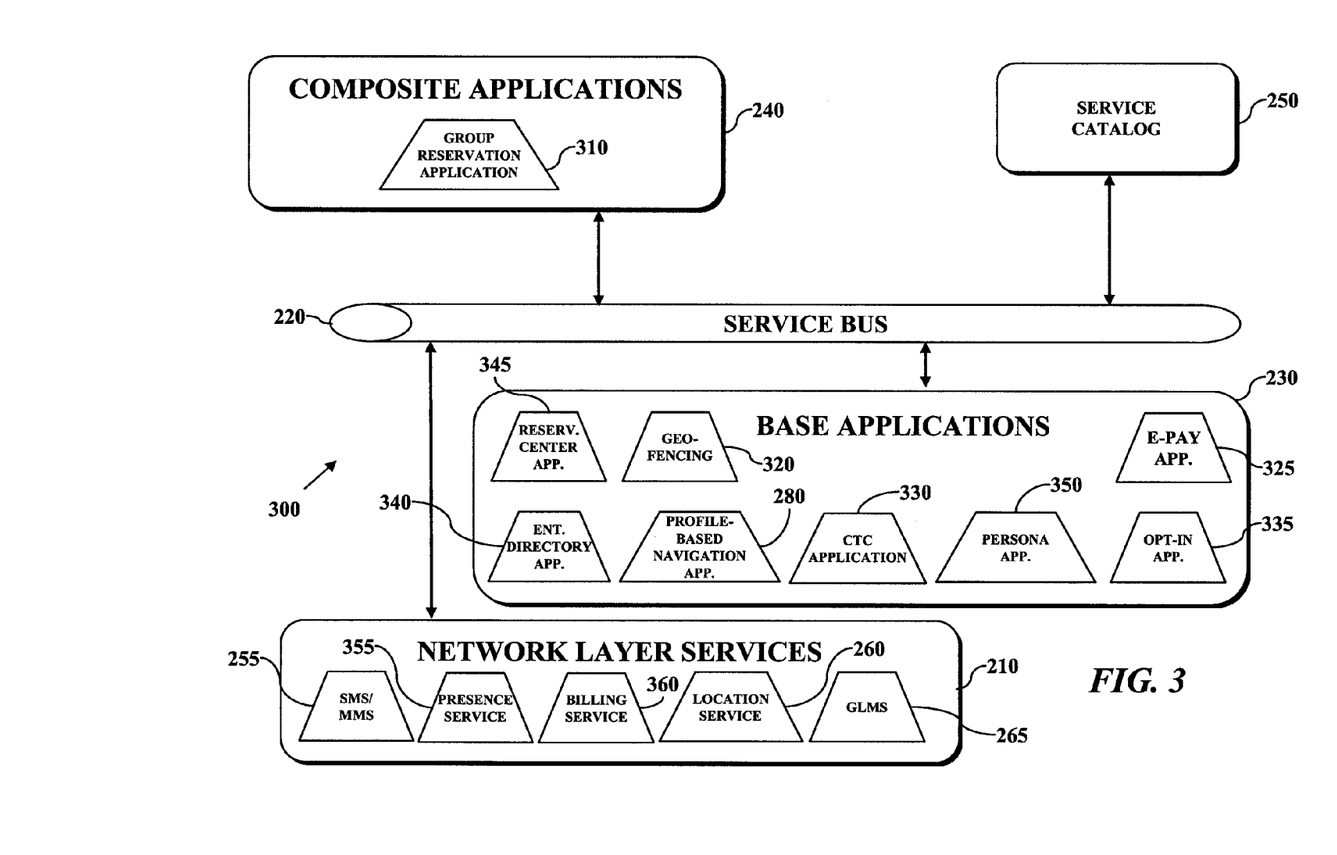
FIG. 3 is a block diagram of a network application architecture for implementing another embodiment of the invention.

Referring now to FIG. 3, depicted is another embodiment of the network application architecture 200 of FIGS. 2A-2B. However, in this embodiment the network application architecture 300 relates to a group reservation composite application 310 that is provided in accordance with the principles of the invention. In one embodiment, the group reservation composite application 310 comprises the logic to enable an initiating subscriber (e.g., initiating subscriber 110) to invite a group of target subscribers (e.g., target subscribers 160) to participate in a reservation-based activity, which may also be a fee-based activity. While one exemplary embodiment of a group reservation composite application 310 relates to the context of reserving a golf tee time for a defined group, it should equally be appreciated that numerous other contexts would be consistent with the principles of the invention.

The base applications 230 of FIG. 3 usable in providing a group reservation composite application 310 include the geo-fencing application 320. In one embodiment, the geo-fencing application 320 is a subscriber location network application through which subscriber notification is provided based on the presence of one or more mobile subscribers within a specified area (i.e., geo-fence). In one embodiment, the geo-fencing application 320 is network-independent and may be invoked through either of two network logic channels. The first channel is through an online portal in which a subscriber provides certain login information. Thereafter, the subscriber may configure a list of target subscribers to monitor, or the group name for a desired group of target subscribers. In addition, the initiating subscriber may have to provide the specific criteria for triggering the geo-fence notification. The second channel is by having a separate network application (e.g., group reservation composite application 310) register directly with the geo-fencing application 320.

The other base applications 230 of FIG. 3 include an e-payment application 325 for initiating online payment transactions, a click-to-conference (CTC) application 330 for inviting target subscribers to participate in a live conference call with other subscribers, an opt-in application 335 whereby target subscribers may accept or decline a proposed transaction, an entertainment directory service 340 for locating businesses in defined areas, and a reservation center application 345 for making online reservations for the subject activity.

It should be noted that the previously-described composite profile-based navigation application 280 is depicted as being a base application 230 in the embodiment of FIG. 3. This is due to the fact that the profile-based navigation application 280 is now being combined with other applications and services to provide a new more complex composite application (i.e., group reservation composite application 310). However, the profile-based navigation application 280 may still be comprised of the same logic described above with reference to FIG. 2B Finally, the base applications 230 of FIG. 3 further include a persona application 350, which may be based on the previously-described subscriber profile base application 270 in combination with the previously-described presence service 355. In short, the persona application 330 may comprise logic for providing information to the composite application 310 representative of the target subscribers availability, determined in accordance with their specific user preferences. It should be appreciated that the billing service 360 may be a network layer service for implementing the previously-mentioned e-payment application 325.

Figure 4A:
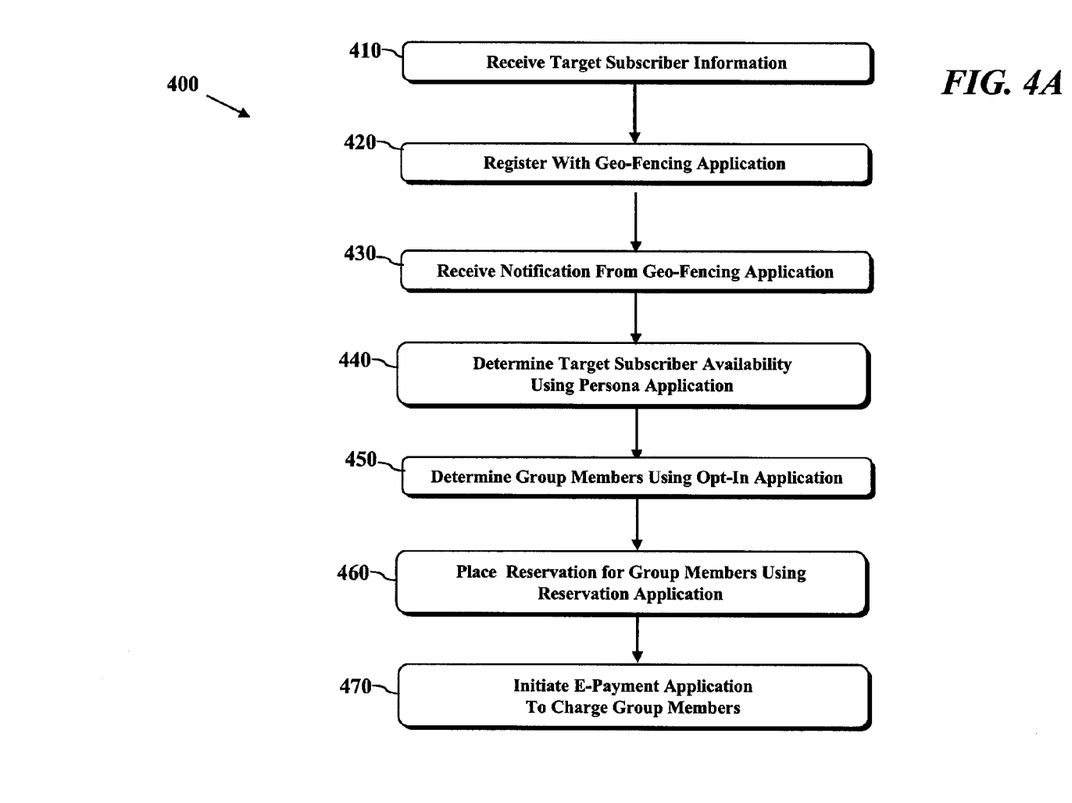
FIGS. 4A-4B is a process for implementing one embodiment of the invention.

FIG. 4A depicts one embodiment of a process 400 for implementing the network application architecture 300 of FIG. 3. Specifically, process 400 begins at block 410 where a group reservation composite application (e.g., composite application 310) may receive specific information relating to the target subscribers (e.g., target subscriber 160), including subscriber identification information, group name, zip codes, etc. In one embodiment, the information of block 410 may be provided by an initiating subscriber (e.g., initiating subscriber 110). Process 400 thereafter continues to block 420 where the group reservation composite application may register with a geo-fencing application (e.g., geo-fencing application 320, or other subscriber location network application) with triggering criteria, such as group name, zip code, minimum number of participants, etc.

Once the triggering criteria has been met for the geo-fencing application, the composite application may receive a notification that is sent from the geo-fencing application at block 430 indicating that the triggering criteria have been met. In one embodiment, the triggering criteria may relate to detecting that one or more of the target subscribers have entered a predefined area.

At this point, process 400 may continue to block 440 where a determination may be made as to the target subscriber(s) availability. In one embodiment, the target subscriber(s) availability may be determined by having the group reservation composite application invoke a persona application (e.g., persona application 350) to check the presence status of the target subscriber(s).

Assuming that the at least one of the target subscribers is available, process 400 may then continue to block 450 where the group reservation composite application may interact with the target subscriber(s) to decide whether to continue. In one embodiment, the composite application may invoke an opt-in application, such as opt-in application 335 of FIG. 3.

Again assuming that at least one of the target subscribers desires to continue with the reservation, process 400 may then move to block 460 where a reservation may be placed for those group members who has decided to participate (e.g., opted-in at block 450). In one embodiment, the operation of block 470 may be performed by invoking an online reservation application, such as reservation center application 345 of FIG. 3. During or following the operation of block 460, the group reservation composite application may initiate an online payment application (e.g., e-payment application 325) during which the group members will be charged accordingly.

Figure 4B:
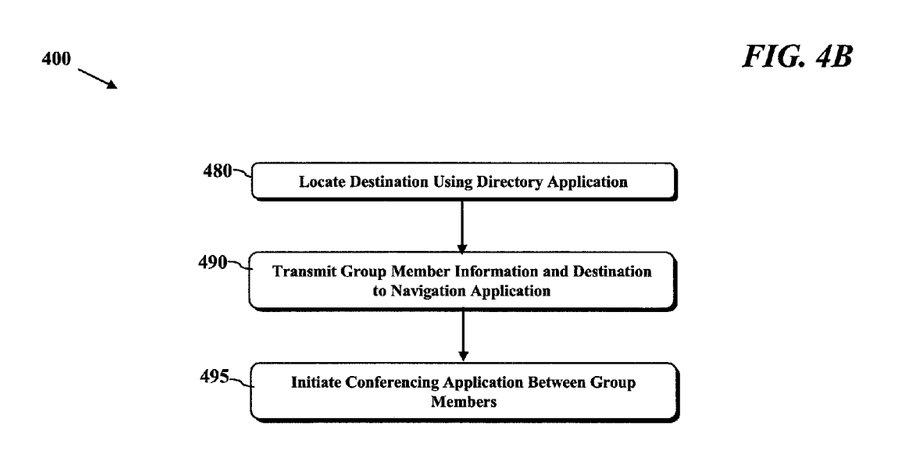

In another embodiment, process 400 may continue, as depicted in FIG. 4B. In particular, process 400 may further include locating the destination using an online directory service, such as entertainment directory application 340, at block 480. Once located, the group reservation composite application performing process 400 may send the group members information on the other group members, as well as destination information at block 490. In one embodiment, the destination information of block 490 may include directions to the destination provided be a navigation application (e.g., profile-based navigation application 280). Finally, process 400 may continue to block 495 where a conference call may be initiated between the group members using the previously-described CTC application 330, during which the group members may make additional arrangements or exchange other information relating to the reservation-based activity.

Figure 5:
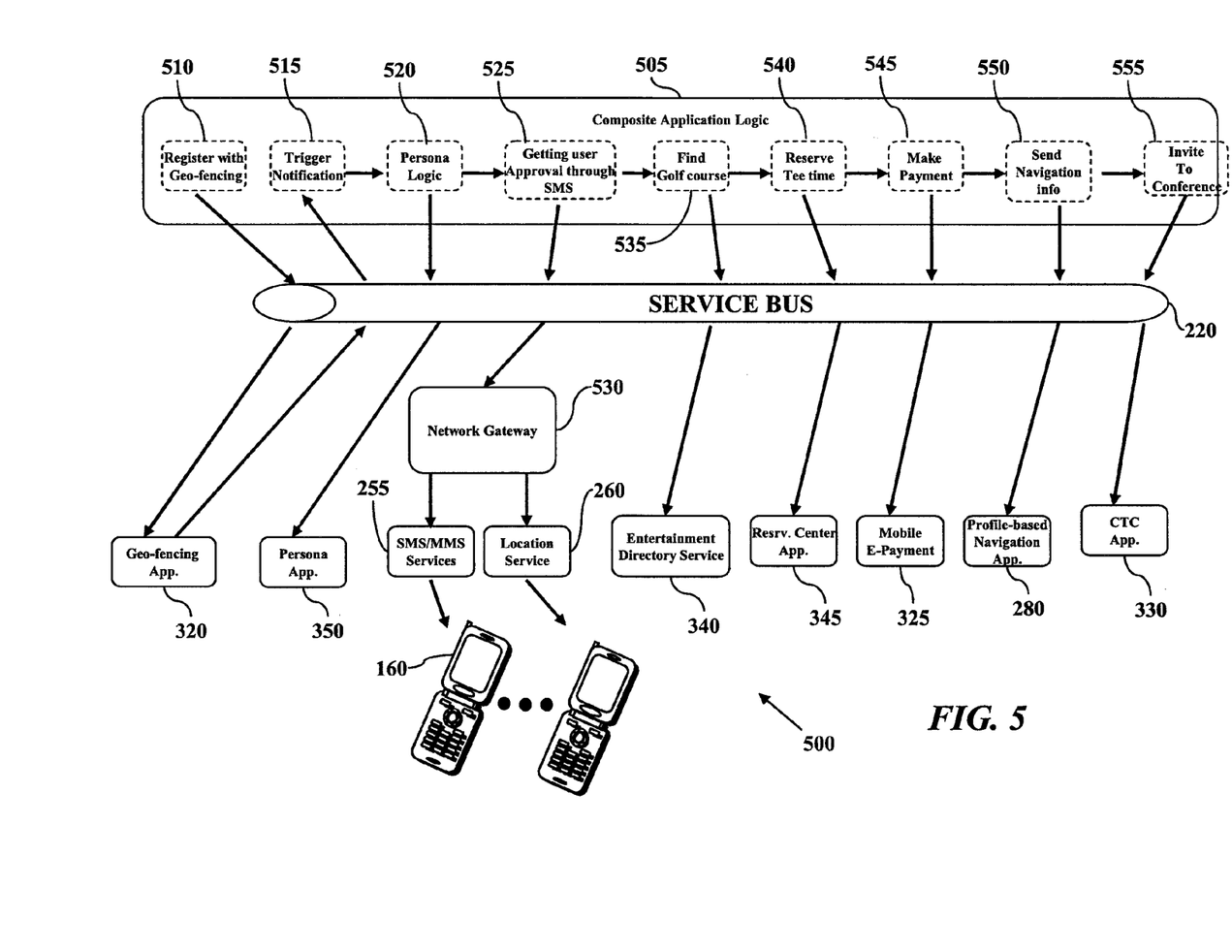
FIG. 5 is a block diagram for a implementing another embodiment of a network application architecture of the invention.

Referring now to FIG. 5, depicted is one embodiment of a network application architecture 500 for implementing a group reservation composite application (e.g., composite application 310) in the form of a golf tee time reservation application. As shown, the composite application logic 505 includes logic 510 for registering with geo-fencing application 320 over service bus 220. Composite application logic 505 further includes trigger notification logic 515 to receive a notification from the geo-fencing application 320 over service bus 220 indicating that the triggering criteria have been met. Persona logic 520 may then be used to determination the availability of the target subscribers 160 using the previously-described persona application 350.

For those target subscribers which are available, composite application logic 505 further includes user approval logic 525 may then determine which target subscribers 160 desire to continue with the reservation process. In one embodiment, this may be accomplished by messaging the target subscribers 160 using SMS/MMS service 255 via network gateway 530.

Logic 535 may then be used to locate the golf course using, for example, entertainment directory service 340. In one embodiment, logic 535 may comprise logic for finding an online reservation portal for the golf course, such as reservation center applications 345, or it may include determining the physical location for the subject golf course.

Continuing to refer to FIG. 5, composite application 505 is depicted as further including logic 540 for reserving a tee time for the group members, which in one embodiment invokes reservation center applications 345 for the subject golf course. During or following the reservation operation performed by logic 540, the composite application 505 may further include logic 545 for initiate an online payment application, such for example, mobile e-payment application 325 so that the group members can each be charged for their respective round of golf.

Composite application 540 also includes logic 550 for sending navigation information to each group member using the profile-based navigation application 280. Finally, logic 555 may be used to conference in the group members using the previously-described CTC application 330, in order to facilitate the exchange of other information relating to the members' upcoming round of golf.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for making a reservation over a wireless network for a group-based activity using a network-independent composite application, the method comprising the acts of:

receiving group reservation information for a reservation from an initiating subscriber over the wireless network;

registering the composite application with a subscriber location network application to provide triggering criteria including at least one target subscriber, a group name, a predetermined area, and a minimum number of participants to the subscriber location network application;

receiving at the composite application a notification from the subscriber location network application indicating that a target subscriber is within the predetermined area;

invoking a persona network application by the composite application automatically based on said notification to check network presence status information of the target subscriber to determine an availability of said target subscriber;

invoking an opt-in network application by the composite application to provide, if available, said target subscriber with an option to participate in said group-based activity;

invoking a network reservation application by the composite application to make a reservation for the target subscriber to participate in said group-based activity in response to the target subscriber opting to participate;

locating a destination using an entertainment directory service for the group-based activity using a navigation application; and transmitting, to the target subscriber, navigation information provided by the navigation application for said destination, wherein at least one of the subscriber location network application, the persona network application, the opt-in network application, the network reservation application, the entertainment directory service and the navigation application is selected by the composite application according to a profile of the target subscriber provided to the composite application by a profile base application.

2. The method of claim 1, further comprising the act of initiating an electronic payment transaction for said reservation using an electronic payment application.

3. The method of claim 1, wherein the subscriber location network application is a network-independent geo-fencing application.

4. The method of claim 1, wherein the group-based activity is golf and the reservation is for a golf tee time.

5. A computer program product, comprising:

a non-transitory processor readable medium having processor executable code embodied therein to making a reservation over a wireless network for a group-based activity using a network-independent composite application, the processor readable medium having:

processor executable program code to receive group reservation information for a reservation from an initiating subscriber over the wireless network;

processor executable program code to register the composite application with a subscriber location network application to provide triggering criteria including at least one target subscriber, a group name, a predetermined area, and a minimum number of participants to the subscriber location network application;

processor executable program code to receive at the composite application a notification from the subscriber location network application indicating that a target subscriber is within the predetermined area;

processor executable program code to determine, automatically based on said notification, an availability of said target subscriber by invoking a persona network application by the composite application to check network presence status information of the target subscriber;

processor executable program code to invoke an opt-in network application by the composite application to provide, if available, said target subscriber with an option to participate in the group-based activity;

processor executable program code to invoke a network reservation application by the composite application to make a reservation for the target subscriber to participate in said group-based activity in response to the target subscriber opting to participate;

processor executable program code to locate a destination using an entertainment directory service for the group-based activity using a navigation application; and processor executable program code to transmit, to the target subscriber, navigation information provided by the navigation application for said destination, wherein at least one of the subscriber location network application, the persona network application, the opt-in network application, the network reservation application, the entertainment directory service and the navigation application comprises a network-independent application accessed by the composite application and selected by the composite application according to a profile of the target subscriber provided to the composite application by a profile base application.

6. The computer program product of claim 5, wherein the processor readable medium further includes processor executable program code to initiate an electronic payment transaction for said reservation using an electronic payment application.

7. The computer program product of claim 5, wherein the subscriber location network application is a network-independent geo-fencing application.

8. The computer program product of claim 5, wherein the processor readable medium further includes processor executable program code to receive, prior to the processor executable program code to register, group reservation information for said reservation from an initiating subscriber over the wireless network.

9. The computer program product of claim 5, wherein the processor readable medium further includes:

processor executable program code to locate a destination using an entertainment directory service for the group-based activity using a navigation application; and processor executable program code to transmit, to the target subscriber, navigation information provided by the navigation application for said destination, wherein at least one of the entertainment directory service and the navigation application are selected according to a profile of the target subscriber provided by the profile base application.

10. A method for making a reservation over a wireless network for a group-based activity using a network-independent composite application, the method comprising the acts of:

receiving group reservation information for a reservation from an initiating subscriber over the wireless network;

registering the composite application with a subscriber location network application to provide triggering criteria including at least one target subscriber, a group name, a predetermined area, and a minimum number of participants to the subscriber location network application;

receiving a notification from the subscriber location network application indicating that a target subscriber is within the predetermined area;

accessing a subscriber availability application, in response to said notification, to check network presence status information of the target subscriber to determine to determine an availability of said target subscriber;

accessing an opt-in application to provide the target subscriber with an option to participate in said group-based activity;

accessing an online reservation application to make a reservation for the target subscriber to participate in said group-based activity using an online reservation application in response to the target subscriber opting to participate;

locating a destination using an entertainment directory service for the group-based activity using a navigation application; and transmitting, to the target subscriber, navigation information provided by the navigation application for said destination, wherein at least one of the subscriber location network application, the subscriber availability application, the opt-in application, and the online reservation application is a network-independent application in communication with the composite application, and wherein at least one of the subscriber location network application, the persona network application, the opt-in network application, the network reservation application, the entertainment directory service and the navigation application is selected by the composite application according to a profile of the target subscriber provided by a profile base application to the composite application.

11. The method of claim 10, further comprising accessing an electronic payment application to initiate an electronic payment transaction for said reservation.

12. The method of claim 10, wherein the subscriber location network application is a network-independent geo-fencing application.

13. The method of claim 10, further comprising, prior to said registering, receiving group reservation information for said reservation from an initiating subscriber over the wireless network.

14. The method of claim 10, wherein said subscriber availability application is a persona network application which is based on a user-preference service and a network presence service.

15. The method of claim 10, further comprising the acts of:
accessing an entertainment directory service to locate a destination for the group-based activity; and
accessing a messaging application to transmit, to the target subscriber, navigation information provided by said entertainment directory service for said destination,
wherein at least one of the entertainment directory service and the messaging application are selected according to a profile of the target subscriber provided by the profile base application.

16. The method of claim 10, wherein the group-based activity is golf and the reservation is for a golf tee time.

* * * * *